US011971060B2

(12) United States Patent
Mordelt

(10) Patent No.: US 11,971,060 B2
(45) Date of Patent: Apr. 30, 2024

(54) SELF-PUNCHING FUNCTIONAL ELEMENT, COMPONENT ASSEMBLY, AND METHOD OF MANUFACTURING A COMPONENT ASSEMBLY

(71) Applicant: PROFIL Verbindungstechnik GmbH & Co. KG, Friedrichsdorf (DE)

(72) Inventor: André Mordelt, Frankfurt am Main (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 23 days.

(21) Appl. No.: 17/729,478

(22) Filed: Apr. 26, 2022

(65) Prior Publication Data

US 2022/0341454 A1  Oct. 27, 2022

(30) Foreign Application Priority Data

Apr. 27, 2021  (DE) .......................... 102021110729.6

(51) Int. Cl.
*F16B 37/06* (2006.01)
*B23P 19/06* (2006.01)
*F16B 19/10* (2006.01)

(52) U.S. Cl.
CPC ........ *F16B 19/1027* (2013.01); *B23P 19/062* (2013.01); *F16B 37/068* (2013.01)

(58) Field of Classification Search
CPC .... F16B 37/068; F16B 37/062; F16B 37/065; F16B 19/086
USPC ................................................. 411/179–181
See application file for complete search history.

(56) References Cited

U.S. PATENT DOCUMENTS

| 3,234,987 | A | * | 2/1966 | Hentzi | F16B 37/068 |
| | | | | | 29/520 |
| 3,282,315 | A | * | 11/1966 | Zahodiakin | F16B 37/068 |
| | | | | | 411/968 |
| 3,871,264 | A | * | 3/1975 | Hallock | F16B 17/006 |
| | | | | | 411/499 |
| 6,146,072 | A | * | 11/2000 | Muller | F16B 37/068 |
| | | | | | 411/176 |
| 7,575,405 | B2 | * | 8/2009 | Goodall | F16B 37/065 |
| | | | | | 411/181 |

(Continued)

FOREIGN PATENT DOCUMENTS

| DE | 102008057903 A1 | 7/2010 |
| EP | 1553312 A2 | 3/2002 |
| EP | 3216556 A1 | 3/2017 |

*Primary Examiner* — Flemming Saether
(74) *Attorney, Agent, or Firm* — Gregory J. Gore, Esq.

(57) ABSTRACT

A self-punching functional element serves for the fastening to a workpiece and comprises a head part that has an abutment surface for introducing a punching force directed in a punching direction into the functional element and a rivet section that extends away from the head part in the punching direction and that comprises a free end that is provided with a first punching edge for punching a slug out of the workpiece. The functional element further comprises a functional section that has a punching pilot that is radially surrounded by the rivet section, that extends away from the head part in the punching direction, and that has a second punching edge for punching a hole into the slug. The second punching edge is set back with respect to the first punching edge in the punching direction.

23 Claims, 3 Drawing Sheets

(56) References Cited

U.S. PATENT DOCUMENTS 7,988,394 B2 * 8/2011 Babej .................... F16B 37/062
411/181

* cited by examiner

SELF-PUNCHING FUNCTIONAL ELEMENT, COMPONENT ASSEMBLY, AND METHOD OF MANUFACTURING A COMPONENT ASSEMBLY

The present invention relates to a self-punching functional element, to a component assembly that comprises a workpiece and a self-punching functional element, and to a method of manufacturing such a component assembly.

Such functional elements usually have a functional section that in turn serves to fasten further components. They are widely used in the automotive industry, among others.

Functional elements can be bolt elements whose shafts can be provided with a thread or nut elements that can, for example, have an internal thread.

Functional elements are known in different designs. On the one hand, there are, for example, rivet elements, for example rivet nuts, that have a rivet section that is deformed on the attachment to a sheet metal part to form a rivet bead and to form an annular receiver for the margin of a hole in the sheet metal part with a head part. With such rivet elements, the functional element is therefore deformed on the attachment to the sheet metal part. Furthermore, force fitting elements are known in which the element itself is not intentionally deformed on the attachment to a sheet metal part. Rather, the sheet material itself is deformed to bring it into engagement with undercuts of the respective force fitting element.

It is generally known to perform the setting of the functional elements, in particular rivet elements, in a self-punching manner. In this respect, a slug is punched out of the component and usually remains in the rivet section, wherein a functional section of the functional element, in the case of the rivet nut in particular an internal thread, can be blocked by the slug.

To circumvent this problem, the slug can, for example, be punched out so small that it can be led away by the internal thread. However, a very strong reshaping of the rivet section is not necessary for this purpose, whereby its tendency to tear is greatly increased. In addition, damage to the internal thread during the slug removal and a jamming of the slug in the internal thread cannot be excluded. It is also possible to expel the blocking slug by means of a punch guided by the internal thread. However, this requires a further workstep.

It is an object of the present invention to provide a self-punching fastening element that can be reliably fastened to a workpiece with a small assembly effort. A component assembly comprising the workpiece and the element and a method of manufacturing the component assembly will furthermore be specified.

This object is satisfied by the respective subject of the independent claims. Advantageous embodiments are the subject of the dependent claims and are indicated in the description and the drawings.

The self-punching functional element in accordance with the invention serves for the fastening to a workpiece, in particular to a sheet metal part, and comprises a head part and a functional section. The head part has an abutment surface for introducing a punching force directed in a punching direction into the functional element and a rivet section that extends away from the head part in the punching direction and that comprises a free end that is provided with a first punching edge for punching a slug out of the workpiece. The functional section has a punching pilot that is radially surrounded by the rivet section, that extends away from the head part in the punching direction, and that has a second punching edge for punching a hole into the slug. The second punching edge is set back with respect to the first punching edge in the punching direction.

The functional element in accordance with the invention is suitable for being inserted into a workpiece that is not pre-punched, in particular into a sheet metal part, by means of punching. On the insertion of the functional element into the workpiece, a slug is punched out of the workpiece by means of the first punching edge and the functional element is fastened to the workpiece by means of the rivet section by reshaping the rivet section such that it forms an undercut acting in an axial direction and the functional element is thereby securely held at the workpiece.

During the punching process, the slug is usually fixedly clamped to the radial inner wall of the rivet section and remains there. However, in order to ensure the function of the functional section without restrictions, a hole is punched into the slug by means of the second punching edge, which is set back with respect to the first punching edge, in the course of the further punching process so that a slug ring is produced which can be fixedly clamped between the punching pilot and the rivet section. The functional section is thereby axially exposed.

Thus, the functional element in accordance with the invention can be fastened to the workpiece in a self-punching manner, i.e. with a relatively small assembly effort, wherein a flawless functioning of the functional section is simultaneously ensured.

The functional element, which usually consists of metal, in particular steel, can in particular be a nut element, but the design as a bolt element is also conceivable. Even in the case of a bolt element, it can namely be necessary that the head part is at least sectionally accessible from the side of the rivet section, for example, if a functional section is arranged there, for instance, a blind bore with or without an internal thread.

The nut element preferably has an internal thread that forms the functional section, whereas a bolt element can have a shaft provided with an external thread. Instead of the thread, other features can also be provided that are, for example, suitable for fastening a further component or for providing another functionality. The functional section can also be sectionally or completely formed as a smooth pin or a smooth hole.

In an advantageous embodiment, a gap, in particular an annular gap, for receiving the slug ring is formed between the rivet section and the punching pilot. Thus, the position of the slug ring after the punching process can be fixed such that said slug ring does not impair the functional section.

The gap can be bounded by a radial outer surface of the punching pilot and by a radial inner surface of the rivet section in the radial direction. To secure the slug ring, the inner surface of the rivet section and/or the outer surface of the punching pilot can have one or more radially inwardly projecting elevated portions, for example, in the form of at least one rib that extends in the axial direction and that has a greater axial extent than the thickness of the workpiece. With the elevated portion, the slug punched out of the workpiece or the slug ring punched out of the slug can be reliably secured to the functional element in a simple manner, namely if a section of the elevated portion is scraped off in the course of the punching process and scraped-off material forms a securing undercut.

The rivet section and/or the punching pilot is/are preferably annular, in particular circular, oval, or polygonal. In the case of an oval or polygonal design of the rivet section, an automatic security against rotation of the functional element at the workpiece is achieved.

The head part can be flange-like and can have a workpiece contact section, with the rivet section and the punching pilot extending away from said workpiece contact section. It is thereby ensured that the functional element contacts the workpiece in a fixed and stable manner.

The workpiece contact section preferably comprises a first contact surface and a second contact surface that are in particular annular, with the first contact surface being arranged between the punching pilot and the rivet section and the second contact surface being arranged radially outside the rivet section. With the second contact surface, the functional element can regularly contact the workpiece or be disposed on the workpiece, while the first contact surface serves as a contact surface or as an axial boundary for the slug ring. The first contact surface can in particular be set back with respect to the second contact surface in the punching direction.

The ratio of an extent of the rivet section in a non-reshaped state in the punching direction to an extent of the punching pilot in the punching direction can amount to approximately two to approximately six, preferably approximately three to approximately five. It is thereby ensured that, on the one hand, the rivet section has a sufficient height to be reshaped and to form an undercut, but, on the other hand, the punching pilot also has a sufficient height to clamp the slug ring between the rivet section and the punching pilot.

In an advantageous embodiment, the rivet section and the punching pilot extend in parallel with one another, in particular coaxially, such that both punching processes and the riveting process can be easily and effectively combined with one another in one workstep.

The punching pilot can have an undercut that is preferably formed by a conical outer wall. The outer wall can therefore be inclined relative to the punching direction and can diverge in the punching direction. To form the undercut and to nevertheless be able to effectively secure the slug ring to the outer surface of the punching pilot, it is suitable to keep the angle of inclination relatively small, for example in the range of up to 20°, preferably up to 10°, in particular 5° or less.

The free end of the rivet section can be radially outwardly rounded or inclined at least in sections such that the rounding or inclination extends directed back in the punching direction, viewed from the punching edge arranged radially inwardly at the free end. During the punching process, the insertion of the rivet section into the punched hole is thereby facilitated.

The functional element can have at least one feature providing security against rotation that is preferably formed as a rib or a groove. The functional element can in particular have a plurality of features providing security against rotation that are in particular arranged at equal spacings from one another at a respective outer surface of the rivet section and/or of the workpiece contact section.

The component assembly in accordance with the invention has a workpiece, in particular a sheet metal part, having a punched hole and a previously described functional element, said functional element being introduced into the punched hole while separating a punched slug by means of the first punching edge such that reshaped material of the rivet section at least sectionally engages behind material of the workpiece adjoining the punched hole. A slug ring separated from the punched slug by means of the punching pilot can in particular be received in a radial direction between the rivet section and the punching pilot. Due to the separation of the slug ring from the slug, the functional section is kept free so that its proper function is ensured. In addition, the component assembly can be produced by a punching, that is without a pre-punching, so that a low-effort assembly is provided.

The reshaped material can form an undercut closed in a peripheral direction to securely hold the functional element at the workpiece. The material of the rivet section is preferably reshaped radially outwardly to form the undercut.

In a preferred embodiment, a punched margin produced by the first punching edge is flanged by the reshaping of the rivet section. In the reshaping process, the rivet section is placed closely around the punched margin and in turn reshapes it so that a flange of the margin is produced. The rivet section and the punched margin then contact one another closely and largely without play such that the functional element is held at the workpiece in a stable manner.

An assembly region of the workpiece surrounding the punched hole can be reshaped while forming a recess, with the reshaped rivet section and the punching pilot being completely received in the recess in the punching direction. Thus, the workpiece is flat and can be designed without elevated portions towards one side, even in the region of the attached functional element.

The method in accordance with the invention serves to manufacture the previously described component assembly and comprises the following steps:
  providing a previously described functional element;
  providing a workpiece, in particular a sheet metal part;
  introducing a punching force into the functional element to produce a punched hole in the workpiece while separating a punched slug by means of the first punching edge of the rivet section and to separate a slug ring from the punched slug by means of the second punching edge of the punching pilot; and
  reshaping material of the rivet section to at least sectionally engage behind material of the workpiece adjoining the punched hole.

The material of the rivet section can be outwardly reshaped to form an undercut closed in the peripheral direction.

The reshaping of the material of the rivet section can, for example, take place by means of a die, with the material of the rivet section being outwardly reshaped by pressing the free end against a reshaping geometry of the die extending transversely to the punching direction, and with the reshaping geometry preferably having a reshaping surface curved in cross-section. Due to the use of the die, the reshaping of the rivet section can be performed automatically, i.e. only by the punching movement in the punching direction, as soon as the free end of the rivet section contacts the reshaping geometry of the die. A separate step for reshaping the rivet section is not necessary so that the assembly can take place with comparatively little effort.

An assembly region of the workpiece surrounding the punched hole is preferably reshaped by means of an elevated portion of the die surrounding the reshaping geometry and directed opposite to the punching direction. Thus, a recess is produced in the assembly region of the workpiece, in which recess the reshaped rivet section and the punching pilot are received in the punching direction.

The separation of the slug ring can take place by means of an edge of the die cooperating with the punching pilot.

In other words: In accordance with an embodiment of the method, the punching out of the slug takes place in a cooperation of a first edge of the die with the first punching edge of the element, while the hole in the slug takes place by a cooperation of a second edge of the die with the second punching edge of the element. The two edges of the die are preferably arranged coaxially and/or in a plane, wherein the first die edge is arranged radially outside the second die edge. The second die edge preferably surrounds a passage through which the slug punched out of the slug can be ejected.

The invention will be explained purely by way of example in the following with reference to advantageous embodiments. In the drawings, which schematically illustrate the embodiments, FIG. 1 shows a perspective view of a functional element in accordance with an embodiment;

Figure 1:
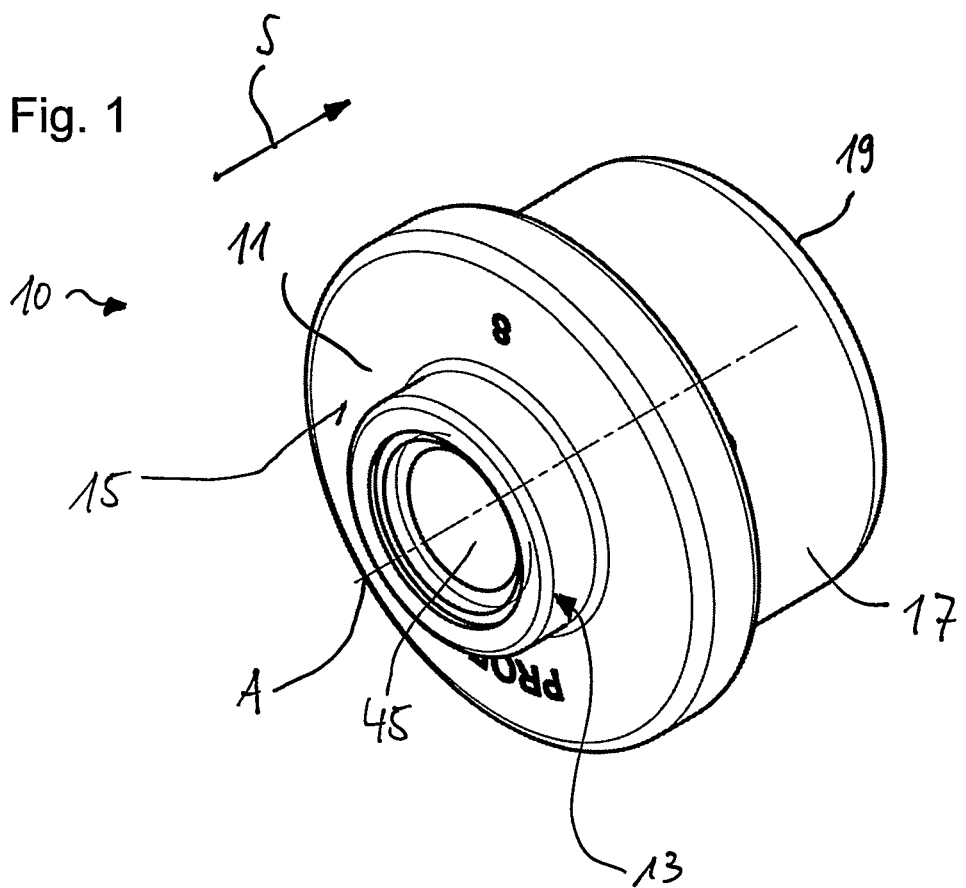
Figure 2:
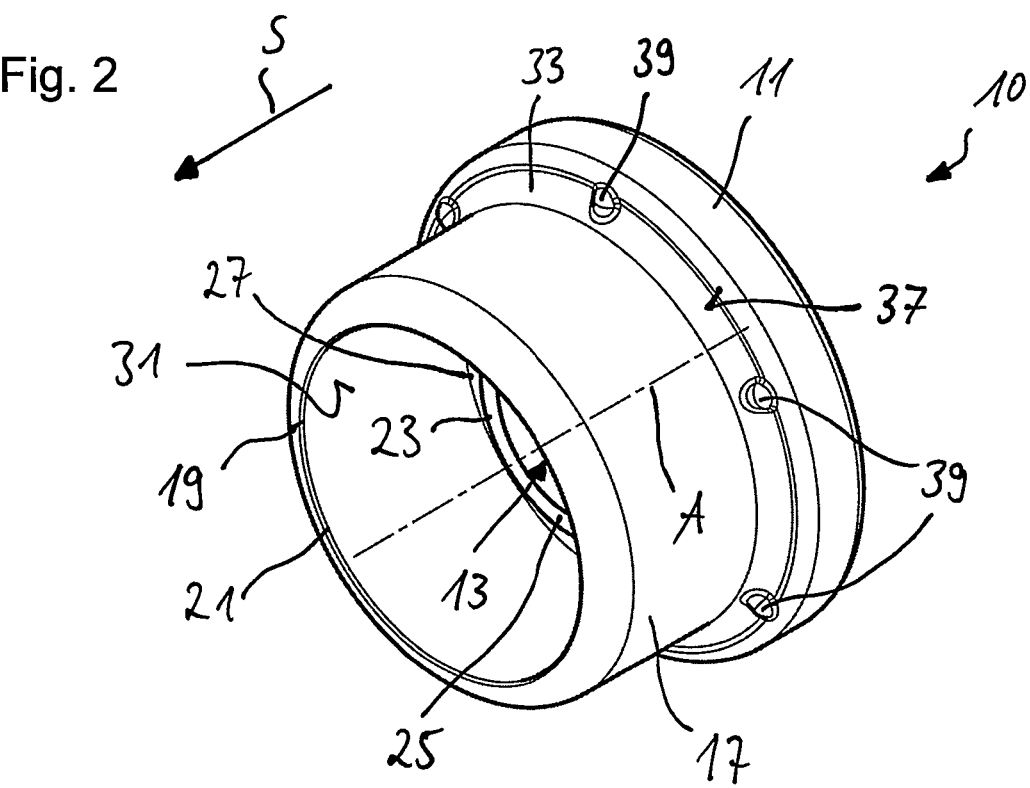
FIG. 2 shows a further perspective view of the functional element of FIG. 1.

FIGS. 1 and 2 show a functional element 10 in different perspective views that is configured as a self-punching rivet nut for punching in a punching direction S. In the present example, the punching direction S extends in parallel with the direction of extent of the axis of symmetry A of the functional element 10.

The functional element 10 comprises a head part 11, which is formed in a flange-like manner and which is provided with a workpiece contact section 33, and a functional section 13. The head part 11 is provided with an abutment surface 15, which extends perpendicular to the punching direction S, and an annular rivet section 17 that extends away from the workpiece contact section 33 in the punching direction S. The functional section 13 comprises a bore 45, which extends coaxially to the axis of symmetry A and which is provided with an internal thread 41 (see FIG. 3), and an annular punching pilot 25 that extends coaxially to the rivet section 17 in the punching direction S away from the workpiece contact section 33 and that is radially surrounded by the rivet section 17.

The rivet section 17 has a radially outwardly rounded free end 19 that is radially inwardly provided with a first punching edge 21. However, the punching pilot 25 is equipped with a second punching edge 23 that is set back with respect to the first punching edge 21 in the punching direction S.

Figure 3:
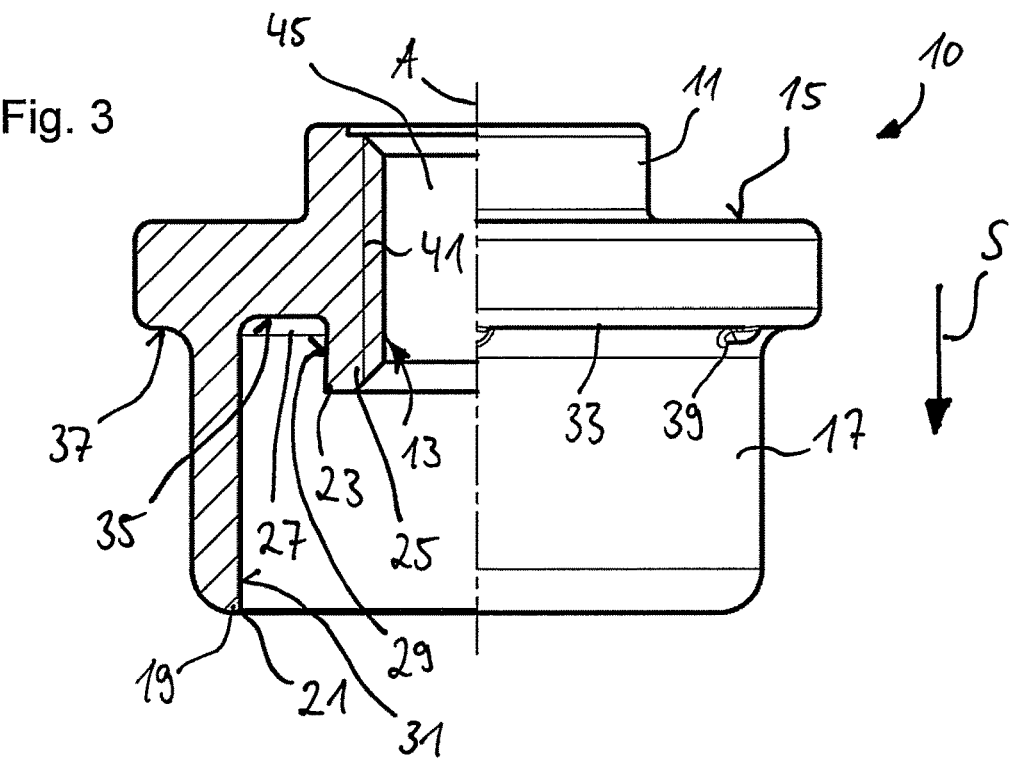
FIG. 3 shows the functional element of FIG. 1 shown in half-section.

The workpiece contact section 33 comprises an annular first contact surface 35 visible in FIG. 3 and an annular second contact surface 37. The first contact surface 35 is set back with respect to the second contact surface 37 in the punching direction S and connects a radial outer surface 29 of the punching pilot 25 to a radial inner surface 31 of the rivet section 17 such that an annular gap 27 arranged between the rivet section 17 and the punching pilot 25 is axially bounded by the first contact surface 35 and radially bounded by the radial outer surface 29 and the radial inner surface 31.

An outer wall of the punching pilot 25, and thus the outer surface 29, extends slightly conically and diverging in the punching direction at an angle of inclination relative to the punching direction S that amounts to approximately 5° in the present example and that can generally be in the range of up to 20°, preferably up to 10°, in particular 5° or less.

The ratio of an extent of the rivet section 17 in the punching direction S, measured from the first contact surface 35 up to the first punching edge 21, to an extent of the punching pilot 25 in the punching direction S, measured from the first contact surface 35 up to the second punching edge 23, amounts to approximately four in the present example. However, the ratio can be in a range from approximately two to approximately six, preferably approximately three to approximately five.

As in particular FIGS. 2 and 3 clearly show, the workpiece contact section 33 is provided with a plurality of features providing security against rotation 39 in the form of ribs arranged at equal spacings from one another. However, alternatively or additionally to the ribs, grooves or differently shaped elements would also be conceivable as features providing security against rotation 39. In addition, the features providing security against rotation 39 could generally also be attached to a radial outer surface of the rivet section 17.

Figure 4:
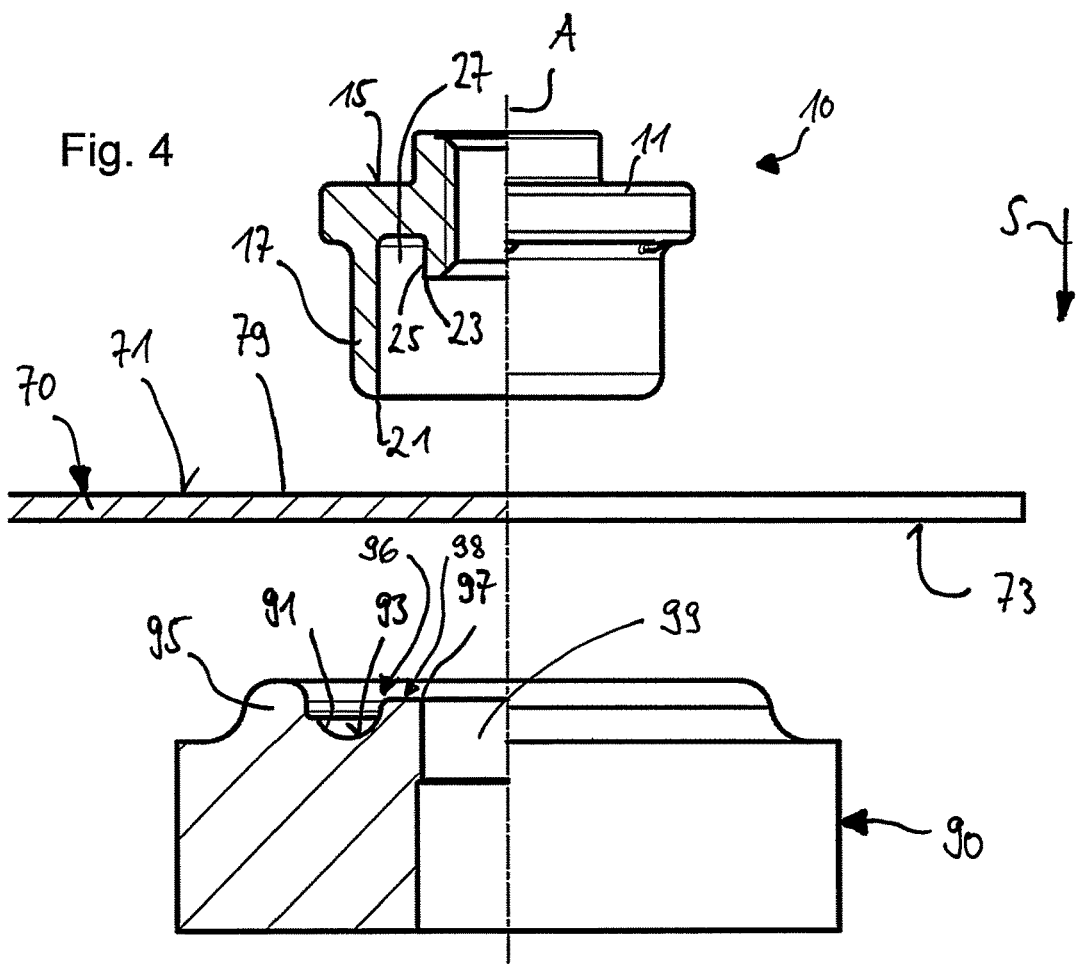
FIG. 4 shows the functional element of FIG. 1, a workpiece, and a die, each shown in half-section.
Figure 5:
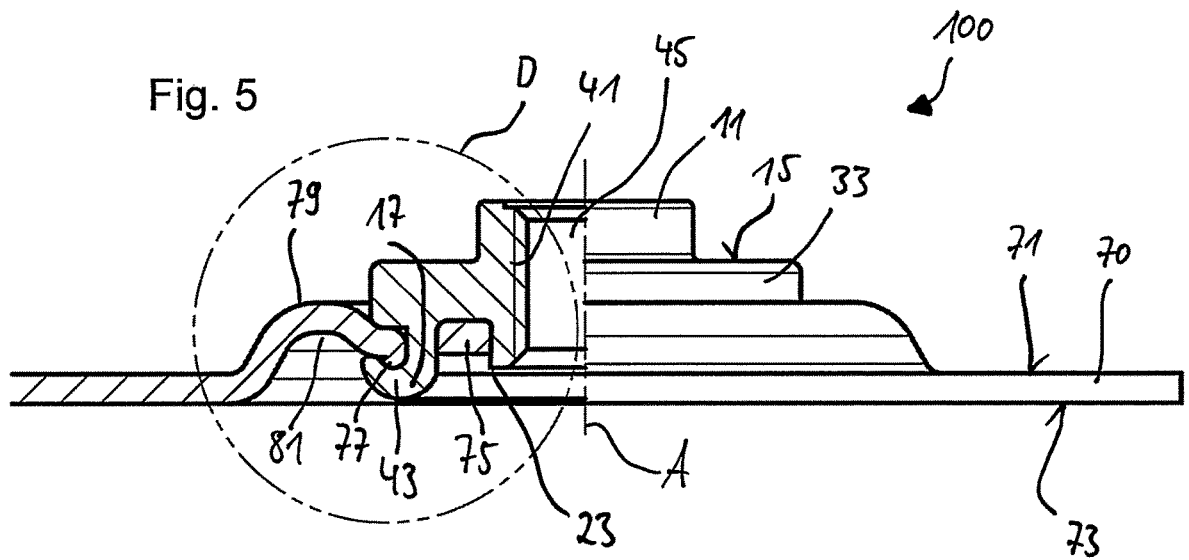
FIG. 5 shows a component assembly in accordance with an embodiment.

With reference to FIGS. 4 and 5, a method of manufacturing a component assembly 100 comprising the functional element 10 will be described in the following.

First, as shown in FIG. 4, a workpiece 70, here a sheet metal part, having a first surface 71 and a second surface 73 is provided next to the functional element 10. In addition, a die 90 is used in the present example that has a reshaping geometry 91 that has a reshaping surface 93 curved in cross-section.

The functional element 10, the workpiece 70, and the die 90 are then aligned with respect to one another and a punching force acting in the punching direction S is introduced into the functional element 10 via the abutment surface 15. The functional element 10, more specifically the first punching edge 21 of the rivet section 17, then impacts the first surface 71 in an assembly region 79 of the workpiece 70 so that a punched slug is separated from the workpiece 70 there in cooperation with an edge 96 of the die 90 and a punched hole bounded by a punching edge 77 is thereby produced.

Figure 6:
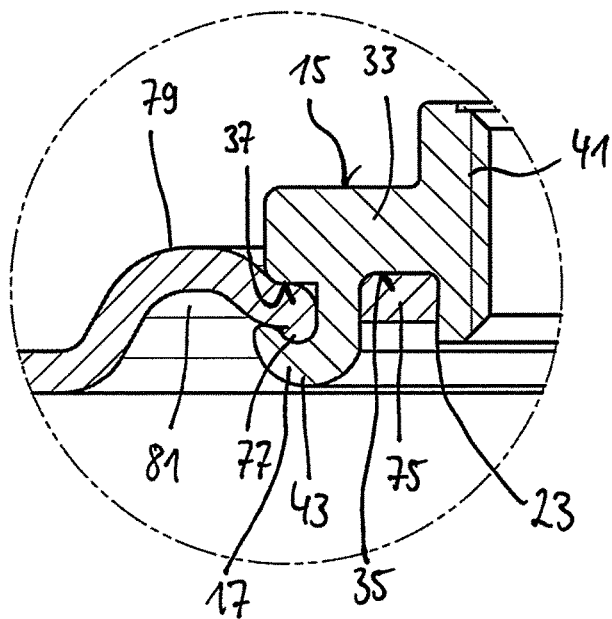
FIG. 6 shows an enlarged view of the detail D of FIG. 5.

In the further course of the punching process, the slug, which is now disposed on an annular surface 98 bounded by the edges 96, 97, is pushed deeper into the hollow space bounded by the rivet section 17 until the second punching edge 23, which is set back with respect to the first punching edge 21 in the punching direction S, contacts the punched slug such that a centrally arranged hole is punched into the punched slug by means of the second punching edge 23 and an edge 97 of the die 90 provided for this purpose. In other words, a slug ring 75 is separated from the punched slug by means of the second punching edge 23 and is fixed in the gap 27, as shown in FIGS. 5 and 6. The slug separated from the slug is reliably disposed of downwardly—i.e. in the punching direction—through a passage 99 of the die 90 such that the functional section 13 is freely accessible. This so-to-say happens automatically in the course of the punching process. Additional worksteps are not required.

Due to the punching force, the free end 19 of the rivet section 17 is furthermore pressed against the reshaping geometry 91 such that material of the rivet section 17 is radially outwardly reshaped to engage behind material of the workpiece 70 adjoining the punched hole and, in this way, to form an axially acting undercut 43 closed in the peripheral direction. In the reshaping process, the rivet section 17 is placed closely around the punched margin 77 and produces a flange at the punched margin 77, as FIGS. 5 and 6 clearly show.

Furthermore, in the assembly region 79, the material of the workpiece 70 is pressed against an elevated portion 95 of the die 90 surrounding the reshaping geometry 91 and directed opposite to the punching direction S such that a recess 81 is produced in the assembly region 79, in which recess 81 the reshaped rivet section 17 and the punching pilot 25 are received in the punching direction S, see in particular FIG. 6.

Consequently, the component assembly 100 described can be manufactured by means of the functional element 10 in a self-punching manner, i.e. with a relatively small assembly effort. Due to the second punching process using the set-back punching pilot 25, the functional section 13, in particular the internal thread 41, can furthermore be kept free such that a flawless functioning of the functional section 13 is simultaneously ensured.

REFERENCE NUMERAL LIST 10 functional element
11 head part
13 functional section
15 abutment surface
17 rivet section
19 free end
21 first punching edge
23 second punching edge
25 punching pilot
27 gap
29 outer surface
31 inner surface
33 workpiece contact section
35 first contact surface
37 second contact surface
39 feature providing security against rotation
41 thread
43 undercut
45 bore
70 workpiece
71 first surface
73 second surface
75 slug ring
77 punched margin
79 assembly region
81 recess
90 die
91 reshaping geometry
93 reshaping surface
95 elevated portion
96, 97 edge
98 annular surface
99 passage
100 component assembly
A axis
S punching direction

The invention claimed is:

1. A self-punching functional element for fastening to a workpiece, said self-punching functional element comprising
a head part that has an abutment surface for introducing a punching force directed in a punching direction into the functional element and a rivet section that extends away from the head part in the punching direction and that comprises a free end that is provided with a first punching edge for punching a slug out of the workpiece; and
a functional section that has a punching pilot that is radially surrounded by the rivet section, that extends away from the head part in the punching direction, and that has a second punching edge for punching a hole into the slug forming a slug ring, wherein the second punching edge is set back with respect to the first punching edge in the punching direction.

2. The functional element in accordance with claim 1, wherein the workpiece is a sheet metal part.

3. The functional element in accordance with claim 1, wherein a gap for receiving the slug ring is formed between the rivet section and the punching pilot.

4. The functional element in accordance with claim 3, wherein the gap is an annular gap.

5. The functional element in accordance with claim 3, wherein the gap is bounded by a radial outer surface of the punching pilot and by a radial inner surface of the rivet section.

6. The functional element in accordance with claim 1, wherein at least one of the rivet section and the punching pilot is annular.

7. The functional element in accordance with claim 1, wherein at least one of the rivet section and the punching pilot is one of circular, oval, and polygonal.

8. The functional element in accordance with claim 1, wherein the head part is a flange that has a workpiece contact section, with the rivet section and the punching pilot extending away from said workpiece contact section.

9. The functional element in accordance with claim 8, wherein the workpiece contact section comprises a first contact surface and a second contact surface that are annular, with the first contact surface being arranged between the punching pilot and the rivet section and the second contact surface being arranged radially outside the rivet section.

10. The functional element in accordance with claim 9, wherein the first contact surface is set back with respect to the second contact surface in the punching direction.

11. The functional element in accordance with claim 1, wherein the ratio of an extent of the rivet section in the punching direction to an extent of the punching pilot in the punching direction amounts to approximately two to approximately six.

12. The functional element in accordance with claim 1, wherein the rivet section and the punching pilot extend in parallel with one another.

13. The functional element in accordance with claim 1, wherein the gap forms an undercut.by a conical outer wall of the punching pilot extending divergently in the punching direction.

14. The functional element in accordance with claim 1, wherein the free end of the rivet section is radially outwardly rounded or inclined at least in sections.

15. The functional element in accordance with claim 1, further comprising at least one feature providing security against rotation at the rivet section and/or at the workpiece contact section.

16. The functional element in accordance with claim 1, wherein the functional section is provided with a thread.

17. The functional element in accordance with claim 1, wherein the functional element is configured as a self-punching nut element.

18. A component assembly, comprising: a workpiece having a punched hole and a self-piercing functional element extending through the punched hole, said self-punching functional element fastened to the workpiece and comprising a head part that has an abutment surface for introducing a punching force directed in a punching direction into the functional element and a rivet section that extends away from the head part in the punching direction and that comprises a free end that is provided with a first punching edge for punching a slug out of the workpiece; and a functional section that has a punching pilot that is radially surrounded by the rivet section, that extends away from the head part in the punching direction, and that has a second punching edge for punching a hole into the slug forming a slug ring, wherein the second punching edge is set back with respect to the first punching edge in the punching direction, and reshaped material of the rivet section at least sectionally engages behind material of the workpiece adjoining the punched hole.

19. The component assembly in accordance with claim 18,
    wherein the slug ring separated from the punched slug by means of the punching pilot is received in a radial direction between the rivet section and the punching pilot.

20. The component assembly in accordance with claim 18,
    wherein the reshaped material forms an undercut closed in a peripheral direction.

21. The component assembly in accordance with claim 20,
    wherein the material of the rivet section is radially outwardly reshaped to form the undercut.

22. The component assembly in accordance with claim 18,
    wherein a punched margin produced by the first punching edge is flanged by the reshaping of the rivet section.

23. The component assembly in accordance with claim 18,
    wherein an assembly region of the workpiece surrounding the punched hole is reshaped while forming a recess, with the reshaped rivet section and the punching pilot being completely received in the recess in the punching direction.

* * * * *